3,359,161
THIAXANTHENOLS, PROCESS OF PRODUCING
AND ANTI-TUSSIVE COMPOSITIONS THEREOF
Povl Viggo Petersen, Virum, and Torben Huld, Kgs.
  Lyngby, Denmark, assignors to Kefalas A/S, Copen-
  hagen-Valby, Denmark
No Drawing. Filed Aug. 29, 1963, Ser. No. 305,510
  16 Claims. (Cl. 167—55)

The present invention relates to novel thiaxanthenols of the general formula:

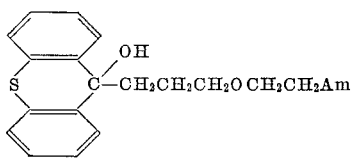

wherein X represents hydrogen, halogen or a lower-alkyloxy group and Am represents a di-lower-alkylamino group, a piperidino, pyrrolidino, morpholino, thiamorpholino, or a N-lower-alkylpiperazino group, as well as non-toxic pharmaceutically acceptable acid addition salts thereof.

It is an object of the present invention to provide novel thiaxanthenols, a method of making the same, novel compositions which are useful in blocking, preventing, inhibiting, reducing, or ameliorating coughing spells and a method of counteracting cough without producing undesired side effects with such novel thiaxanthenols and compositions containing the same as active ingredient.

The compounds of Formula I and the acid addition salts thereof are useful therapeutics and show in animal experiments pronounced antitussive effects in combination with a comparatively low acute toxicity.

The compounds of Formula I and the acid addition salts thereof may be administered either orally or parenterally, for example in the form of capsules, syrups, or solutions for injection.

The invention moreover relates to a method for the preparation of thiaxanthenols of Formula I, whereby a thiaxanthone of the following formula:

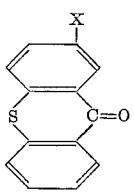

wherein X is as defined above, is subjected to a Grignard reaction with a Grignard reagent of the formula:

AmCH₂CH₂OCH₂CH₂CH₂Mghal    III wherein Am is as defined above and "hal" represents a halogen atom, and the magnesium complex obtained hydrolyzed in the usual manner, as with water, ice-water, ice or the like, whereupon the resulting thiaxanthenol of Formula I is isolated as the free base or in the form of an acid addition salt.

The Grignard reagents of Formula III may be prepared in conventional manner from the corresponding 1-beta-amino-ethoxy-3-halopropanes which are prepared from the corresponding 1-beta-aminoethoxy-3-hydroxypropanes by reaction with a thionyl-halide. The 1-beta-aminoethoxy-3-hydroxypropanes are prepared by reduction with LiAlH₄ from the corresponding 3-hydroxypropoxy-substituted acetamides which are in turn prepared by a basic condensation of trimethylene glycol with the corresponding chloroacetamides.

The Grignard reaction step according to the invention may conveniently be carried out according to conventional procedure for such reactions in an inert solvent such as diethylether, di-n-butylether, tetrahydrofuran, or the like.

The thiaxanthenols of Formula I are not readily crystallizable and are therefore most conveniently isolated in the form of colorless to yellow syrups or oils. The acid addition salts are also frequently secured in the form of oils and are therefore most conveniently prepared in the form of aqueous solutions, for example, as solutions for injection, syrups, or the like. The salts with strong mineral acids are likely to be somewhat discolored in dilute aqueous solution due to the formation of certain amounts of the corresponding thiaxanthylium cation which normally has a red color. The acid addition salts of the novel thiaxanthenol of Formula I are preferably salts of pharmaceutically acceptable organic acids such as acetic acid, tartaric acid, maleic acid, citric acid, and the like, but also mineral acids, for example hydrochloric acid, hydrobromic acid, phosphoric acid, sulphuric acid, and the like, may very well be used, especially in cases where the discoloration which may take place is not deemed detrimental to the use of the antitussive thiaxanthenol in question. The salts of the thiaxanthenols of Formula I with cation exchange resins deserve special mention, as they have proved valuable in oral sustained release preparations since the free base or a biologically absorbable moiety is released from these resin salts slowly and over an extended period of time. These resin salts, therefore, likewise fall within the scope of utilizable antitussives according to the present invention.

The salts may conveniently be prepared by neutralizing a solution of a thiaxanthenol of Formula I with a solution of the equivalent quantity of an acid in either the same solvent or another suitable solvent and isolating the salt in conventional manner, for example in case of slightly soluble salts by filtering off the precipitated addition salt or in case of easily soluble salts by evaporation of the solvent. The resin salts may conveniently be prepared by neutralizing an aqueous suspension of the cation exchange resin in question with the thiaxanthenol of Formula I, isolating the resin salt by filtration and washing with water.

In the foregoing Formula I and elsewhere herein, the terms lower-alkyl and lower-alkyloxy refer to alkyl or alkyloxy radicals containing up to and including four carbon atoms, which radicals may have either straight or branched-chain structure, for example methyl, ethyl, propyl, isopropyl, butyl, isobutyl, methoxy, ethoxy, propoxy, butoxy, or the like.

The starting thiaxanthone compounds of Formula II are preferably such compounds wherein X is a lower-alkyloxy group and especially such wherein X is a methoxy group, mainly from the standpoint of pharmacological importance and excellence of the desired antitussive effects.

The following examples are given by way of illustration only and are not to be construed as limiting.

*Example 1.—2-methoxy-10-[3'-(beta-diethylaminoethoxy)-propyl]-thiaxanthenol-10 and its acid addition salts*

Trimethylene glycol (254 grams) was heated to 115 degrees centigrade and 25 grams of sodium were added in small pieces, whereafter the mixture was heated on a steambath and stirred for one hour. Thereafter 149 grams (1 mole) of N,N-diethylchloroacetamide were added dropwise and the mixture heated on a steambath for two hours. The mixture was then distilled in vacuo and the fraction boiling at 120–160 degrees centigrade of 2–4 mm.

recovered. Yield 91 grams of crude 3-hydroxypropoxy-N,N-diethylacetamide which could be used directly in the subsequent step. The 91 grams of crude 3-hydroxypropoxy-N,N-diethylacetamide were added dropwise to 18 grams of lithium aluminum hydride in 500 milliliters of anhydrous ether. Thereafter water was added dropwise in order to hydrolyze the reaction complex, the mixture was filtered, the ether phase dried and the ether evaporated on a steambath. The residue was distilled under reduced pressure and the fraction boiling at 105 degrees centigrade at 2–3 mm. recovered. Yield, 58 grams of 1-beta-diethylaminoethoxy-3-hydroxypropane.

1 - beta - diethylaminoethoxy-3-hydroxypropane (58 grams) was dissolved in 150 milliliters of chloroform and 70 grams of thionly chloride in 150 milliliters of chloroform were added dropwise while cooling and the mixture thereafter refluxed on a steambath for three hours. Excess thionylchloride and chloroform were evaporated and the residue was made alkaline with aqueous sodium hydroxide, whereafter the separated oil was taken up in ether. The ether was evaporated on a steambath and the residue distilled under reduced pressure to give 50 grams of crude 1-beta-diethylaminoethoxy-3-chloropropan boiling at 65–75 degrees centigrade at 1–2 mm. This crude product was used without further purification in the preparation of the Grignard reagent.

To a solution of 0.25 mole of 3-(beta-diethylaminoethoxy)-propylmagnesium chloride in 200 milliliters of dry tetrahydrofuran was added portionwise 75 grams of 2-methoxythiaxanthone. When the reaction had subsided to some degree, the mixture was refluxed for 30 minutes on a steambath. After cooling, the reaction mixture was poured into water slightly acidified with acetic acid. After filtration the mixture was made alkaline with sodium hydroxide, the tetrahydrofuran layer separated, dried and the tetrahydrofuran evaporated. The residue, which is a yellow syrup, was somewhat impure 2-methoxy-10-3'-(beta - diethylaminoethoxy) - propylthiaxanthenol-10 and weighed 40 grams. The nitrogen content calculated was 3.49%; found by Kjeldahl analysis 3.55%. Acid-addition-salts thereof showed no tendency to crystallize, but were recovered as yellow syrups. The following salts were produced by dissolving the base in dry ether and adding the equivalent amount of the acid in anhydrous ethanol and separating the salt which separates as a syrup: hydrochloride, citrate, oxalate, sulfate, succinate and tartrate.

*Example 2.—2-methoxy-10-[3-(beta-dimethylaminoethoxy)-propyl]-thiaxanthenol-10*

When Example 1 is carried out using 121 grams of N,N-dimethylchloroacetamide instead of N,N-diethylchloroacetamide, 42 grams of crude 3-(beta-diethylaminoethoxy)-propyl chloride boiling at 60–70 degrees centigrade at 3 mm. was obtained.

In exactly the same manner as described in Example 1, but substituting 0.25 mole of 3-(beta-dimethylaminoethoxy)-propyl magnesium chloride for the 3-(beta-diethylaminoethoxy)-propyl magnesium chloride; 2-methoxy-10-[3'-(beta-dimethylaminoethyl) - propyl] - thiaxanthenol-10 was obtained as a yellow syrup in a yield of 35 grams. Calculated: N, percent, 3.75; found; 3.79.

*Example 3.—2 - methoxy - 10 - [3' - (beta-N-piperidinoethoxy)-propyl]-thiaxanthenol-10 and its hydrochloride, acetate, oxalate, maleate, succinate, methanesulphonate and benzoate*

When Example 1 is carried out using 161 grams of N-piperidino chloroacetamide instead of N,N-diethylchloroacetamide, 55 grams of crude 3-(beta-N-piperidinoethoxy)-propyl chloride, boiling at 70–90 degrees centigrade at 1–3 mm., was obtained.

In exactly the same manner as described in Example 1, but substituting 0.25 mole of 3-(beta-N-piperidinoethoxy)propyl magnesium chloride for the 3-(beta-diethylamino-ethoxy)propyl magnesium chloride, 43 grams of 2 - methoxy-10-[3'-(beta-N-piperidinoethoxy)propyl]-thiaxanthenol-10 was obtained as a yellow syrup. Calculated: N, percent, 3.39; found: 3.44.

The hydrochloride, acetate, oxalate, maleate, succinate, methanesulphonate and benzoate were prepared as described in Example 1 and all were recovered as yellow syrups.

*Example 4.—10-[3'-(beta-diethylaminoethoxy)-propyl]-thiaxanthenol-10*

When Example 1 is carried out using 66 grams of thiaxanthone instead of 2-methoxythiaxanthone, 30 grams of 10 - [3' - (beta-diethylaminoethoxy)-propyl]-thiaxanthenol-10 was obtained as a yellow syrup. Calculated: N, percent, 3.78; found: 3.84.

*Example 5.—2-chloro-10-[3'-(beta-diethylaminoethoxy)-propyl]-thiaxanthenol-10*

When Example 1 is carried out using 77 grams of 2-chloro thiaxanthone instead of 2-methoxythiaxanthone, 38 grams of 2-chloro-10-[3'-(beta-diethylaminoethoxy)-propyl]-thiaxanthenol-10 was obtained as a syrup. Calculated: N, percent, 3.45; found: 3.50.

The compounds of Formula I and the acid addition salts thereof may be administered both orally and parenterally, and may be used for example in the form of capsules, syrups, or in the form of the usual sterile solutions for injection.

Most conveniently the compounds of Formula I are administered orally in unit dosage form such as capsules, each dosage unit containing one of the said compounds in an amount of from 1 to 100 mg. calculated as the free amine. The exact individual dosages as well as daily dosages in a particular case will of course be determined according to established principles.

When preparing tablets, the active ingredient is for the most part mixed with ordinary tablet adjuvants such as corn starch, potato starch, talcum, magnesium stearate, gelatine, lactose, gums, or the like. When preparing capsules the active ingredient may with or without ordinary adjuvant materials be placed in a capsule of absorbable material, such as the usual gelatine capsule. Any pharmaceutical tableting adjuvants may be used provided that they are compatible with the active ingredient.

A convenient form for oral administration of the antitussive thiaxanthenols of Formula I is in the form of liquid solutions, emulsions or suspensions.

The proportion of active ingredient in the compositions of the present invention can be varied. It is only necessary that the active ingredient constitute an effective amount, i.e. such that a suitable dosage will be obtained consistent with the dosage form employed. Obviously several unit dosage forms may be administered at about the same time. Not less than about one to five milligrams are used per unit dose, since the use of less than such dosage has not demonstrated any practical value in attaining the desired results. Likewise, it has been found that although an amount greater than 100 milligrams of active ingredient is effective, it may increase the incidence of side effects somewhat and it is therefore preferred to use from about 5 to 50 milligrams per dosage unit in order to obtain satisfactory antitussive effect without serious side-reactions. The figures given are for the free base, and amounts of a particular acid addition salt will of course be suitably adjusted to employ equivalent amounts of the free base considering the molecular weight of the acid moiety thereof.

A suitable formulation for an injectable solution containing one percent of 2-methoxy-10-[3'-(beta-dimethylaminoethoxy) - propyl] - thiaxanthenol - 10 (N 7103 for short) in the form of its acetate is as follows:

|  | Mg. |
|---|---|
| N 7103, acetate | 12 |
| Sorbitol | 40 |
| Sterile water to make 1 ml. | |

A suitable formulation for 1 liter of a liquid mixture containing 2 milligrams of N7103 in one milliliter of the mixture is as follows:

| | G. |
|---|---|
| N 7103 | 2 |
| Saccharose | 250 |
| Glucose | 300 |
| d-Sorbitol | 150 |
| Agar-agar | 0.15 |
| Methylparaben | 0.5 |
| Propylparaben | 0.05 |
| Orange flavor | 10 |

Tartrazine yellow.
Purified water to make a total of 1000 ml.

In order to demonstrate the antitussive effect of the compositions according to the invention, experiments were carried out on animals.

For example, the antitussive effect of 2-methoxy-10-[3' - (beta-diethylaminoethoxy)-propyl]-thiaxanthenol-10 (N 7099 for short) was demonstrated in cats according to the method described by Domenjoz. In cats, anesthetized with allypropymal, 70 mg./kg. i.p.+further smaller amounts according to requirements injected intravenously, the nervus laryngus superior was set free and stimulated electrically every five minutes. The stimulation was adjusted at the beginning of the experiment in such a way that in the untreated animal it caused a reproducible coughing spell. The coughing spells were registered chymographically by means of a tambour. The coughing spells produced as mentioned above was inhibited by N 7099 in about the same dosage as did the well-known antitussive drug codeine phosphate.

The high order of activity of the active agents of the present invention and compositions thereof is evidenced by tests in lower animals. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

Various modifications may be made in the compounds, compositions, and methods of the present invention without departing from the spirit and scope thereof and will be apparent to one skilled in the art. It is therefore to be understood that the invention is limited only by the scope of the appended claims.

We claim:
1. A compound selected from the class consisting of (1) thiaxanthenols of the formula:

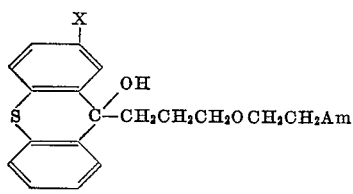

in which X is selected from the group consisting of hydrogen, halogen and lower-alkyloxy, and Am is selected from the group consisting of di-lower-alkylamino, piperidino, pyrrolidino, morpholino, thiamorpholino, and N-lower-alkylpiperazino, and (2) non-toxic acid addition salts thereof.

2. 2 - lower-alkyloxy-10-[3'-(beta-di-lower-alkylaminoethoxy)-propyl]-thiaxanthenol-10.

3. 2 - lower-alkyloxy-10-[3'-(beta-di-lower-alkylaminoethoxy)-propyl]-thiaxanthenol-10 non-toxic acid addition salts.

4. 2 - methoxy-10-[3'-(beta-diethylaminoethoxy)-propyl]-thiaxanthenol-10.

5. 2 - methoxy-10-[3'-(beta-diethylaminoethoxy)-propyl]-thiaxanthenol-10 non-toxic addition salts.

6. 2 - methoxy - 10 - [3'-(beta-dimethylaminoethoxy)-propyl]-thiaxanthenol-10.

7. 2 - methoxy - 10 - [3'-(beta-dimethylaminoethoxy)-propyl]-thiaxanthenol-10 non-toxic acid addition salts.

8. 2-methoxy-10-[3'-(beta - N - piperidinoethoxy)-propyl]-thiaxanthenol-10.

9. 2 - methoxy-10-[3'-(beta-piperidinoethoxy)-propyl]-thiaxanthenol-10 non-toxic acid addition salts.

10. 10 - [3' - (beta - diethylaminoethoxy)-propyl]-thiaxanthenol-10.

11. 10 - [3' - (beta - diethylaminoethoxy)-propyl]-thiaxanthenol-10 non-toxic acid addition salts.

12. The process of producing a compound selected from the group consisting of thiaxanthenols of the formula:

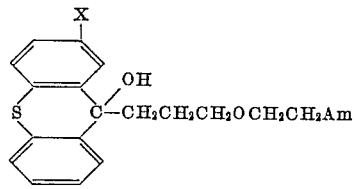

in which X is selected from the group consisting of hydrogen, halogen and lower-alkyloxy and Am is selected from the group consisting of di-lower-alkylamino, piperidino, pyrrolidino, morpholino, thiamorpholino, and N-lower alkylpiperazino, and non-toxic acid addition salts thereof, which comprises subjecting a thiaxanthone of the formula:

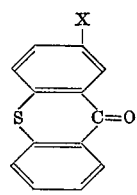

wherein X is as defined above, to reaction with a Grignard reagent of the formula:

$$AmCH_2CH_2OCH_2CH_2CH_2Mghal \qquad III$$

wherein Am is as defined above and wherein "hal" represents a halogen atom, and hydrolyzing the intermediate Grignard complex thus obtained to produce the said thiaxanthenol compound of the formula first above given.

13. The process of claim 12, wherein the starting thiaxanthone is 2-lower-alkyloxythiaxanthone.

14. A pharmaceutical composition in unit dosage form adapted for use as an antitussive comprising a compound selected from the class consisting of (1) thiaxanthenols of the formula:

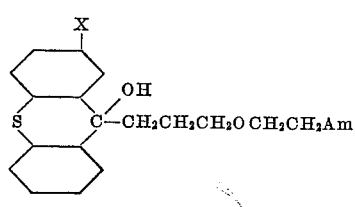

in which X is selected from the group consisting of hydrogen, halogen and lower-alkyloxy, and Am is selected from the group consisting of di-lower-alkylamino, piperidino, pyrrolidino, morpholino, thiamorpholino, and N-lower alkylpiperazino, and (2) non-toxic acid addition salts thereof, in an amount of from 1 to 100 mg. calculated as the free amine, and a pharmaceutical carrier.

15. A pharmaceutical composition in unit dosage form adapted for use as an antitussive comprising a 2-lower-alkyloxy - 10 - [3' - (beta - di - lower - alkylaminoethoxy)- propyl]-thiaxanthenol-10, in an amount of from 1 to 100 mg. calculated as the free amine, and a pharmaceutical carrier.

16. A pharmaceutical composition in unit dosage form adapted for use as an antitussive comprising 2-methoxy-10 - [3' - (beta - diethylaminoethoxy) - propyl] - thiaxanthenol-10, in an amount of from 1 to 100 mg. calculated as the free amine, and a pharmaceutical carrier.

References Cited

UNITED STATES PATENTS 3,244,588  4/1966  Nielsen _____ 167—55

FOREIGN PATENTS 986,875  3/1965  Great Britain.

SAM ROSEN, *Primary Examiner.*

UNITED STATES PATENT OFFICE
CERTIFICATE OF CORRECTION

Patent No. 3,359,161                                December 19, 1967

Povl Viggo Petersen et al.

It is hereby certified that error appears in the above numbered patent requiring correction and that the said Letters Patent should read as corrected below.

Column 3, line 14, for "thionly" read -- thionyl --; line 46, for "[3-(beta-", in italics, read -- [3′-(beta- --, in italics; same column 3, line 59, for "(beta-dimethylaminoethyl" read -- (beta-dimethylaminoethoxy --.

Signed and sealed this 1st day of April 1969.

(SEAL)
Attest:

Edward M. Fletcher, Jr.                              EDWARD J. BRENNER
Attesting Officer                                        Commissioner of Patents